(12) United States Patent
Lakehal-Ayat et al.

(10) Patent No.: US 10,467,482 B2
(45) Date of Patent: Nov. 5, 2019

(54) METHOD AND ARRANGEMENT FOR ASSESSING THE ROADWAY SURFACE BEING DRIVEN ON BY A VEHICLE

(71) Applicant: FORD GLOBAL TECHNOLOGIES, LLC, Dearborn, MI (US)

(72) Inventors: Mohsen Lakehal-Ayat, Mountain View, CA (US); Joost Potma, Utrecht (NL); Michael Seemann, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/435,860

(22) Filed: Feb. 17, 2017

(65) Prior Publication Data
US 2017/0236011 A1    Aug. 17, 2017

(30) Foreign Application Priority Data
Feb. 17, 2016   (DE) ................. 10 2016 202 380

(51) Int. Cl.
*G06K 9/00* (2006.01)
*G05D 1/02* (2006.01)
(Continued)

(52) U.S. Cl.
CPC .......... *G06K 9/00791* (2013.01); *B60R 11/04* (2013.01); *G05D 1/0246* (2013.01);
(Continued)

(58) Field of Classification Search
CPC .. G06K 9/00791; G06K 9/00651; G06K 9/03; G06K 9/6256; G06K 9/46;
(Continued)

(56) References Cited

U.S. PATENT DOCUMENTS 5,774,070 A * 6/1998 Rendon ............... G08G 1/0104
340/905
9,139,204 B1    9/2015 Zhao et al.
(Continued)

FOREIGN PATENT DOCUMENTS

CN    101609607 A    12/2009
CN    101609607 B    7/2011
(Continued)

OTHER PUBLICATIONS

German Search Report dated Jan. 23, 2017 for German Application No. 102016202380.2, 7 pgs.

*Primary Examiner* — Ming Y Hon
(74) *Attorney, Agent, or Firm* — Frank Lollo; Brooks Kushman P.C.

(57) ABSTRACT

The disclosure relates to a method and an arrangement for assessing the roadway surface being driven on by a vehicle. In a method according to the disclosure, on the basis of at least one image recorded with a camera that is present on the vehicle, the roadway surface being driven on by the vehicle is classified using a classifier. The classifier is trained on the basis of image features that are extracted from the at least one image, wherein a plurality of image details are defined in the at least one image. The extraction of image features is performed independently for each of these image details.

18 Claims, 4 Drawing Sheets

(51) Int. Cl.
*B60R 11/04* (2006.01)
*G06K 9/03* (2006.01)
*G06K 9/46* (2006.01)
*G06K 9/62* (2006.01)
*H04N 7/18* (2006.01)

(52) U.S. Cl.
CPC ........... *G06K 9/00651* (2013.01); *G06K 9/03* (2013.01); *G06K 9/46* (2013.01); *G06K 9/6256* (2013.01); *H04N 7/18* (2013.01); *H04N 7/188* (2013.01)

(58) Field of Classification Search
CPC .......... H04N 7/188; H04N 7/18; B60R 11/04; G05D 1/0246
See application file for complete search history.

(56) References Cited

U.S. PATENT DOCUMENTS

| | | | |
|---|---|---|---|
| 9,672,446 B1* | 6/2017 | Vallespi-Gonzalez | G06K 9/6267 |
| 2004/0138831 A1* | 7/2004 | Watanabe | B60T 8/1725 702/33 |
| 2010/0272366 A1* | 10/2010 | Meng | G06K 9/34 382/190 |
| 2012/0326856 A1* | 12/2012 | Levin | B60W 50/0097 340/441 |
| 2013/0226421 A1 | 8/2013 | Horaguchi et al. | |
| 2015/0178572 A1* | 6/2015 | Omer | G08G 1/0112 382/108 |
| 2015/0371095 A1* | 12/2015 | Hartmann | G06K 9/00791 348/148 |
| 2016/0176408 A1* | 6/2016 | Lynch | B60W 40/064 701/23 |
| 2016/0207458 A1* | 7/2016 | Pillai | G06K 9/00791 |
| 2016/0334546 A1* | 11/2016 | Ma | G01W 1/00 |
| 2018/0141563 A1* | 5/2018 | Becker | G06K 9/00791 |
| 2019/0049256 A1* | 2/2019 | Camp | B60W 40/064 |

FOREIGN PATENT DOCUMENTS

| | | |
|---|---|---|
| JP | 2002162343 A | 6/2002 |
| JP | 2014520712 A | 8/2014 |
| WO | 2013173911 A1 | 11/2013 |

* cited by examiner

METHOD AND ARRANGEMENT FOR ASSESSING THE ROADWAY SURFACE BEING DRIVEN ON BY A VEHICLE

CROSS-REFERENCE TO RELATED APPLICATIONS

This application claims foreign priority benefits under 35 U.S.C. § 119(a)-(d) to DE patent application 10 2016 202 380.2 filed Feb. 17, 2016, which is hereby incorporated by reference in its entirety.

TECHNICAL FIELD

The disclosure relates to a method and an arrangement for assessing the roadway surface being driven on by a vehicle.

BACKGROUND

Modern motor vehicles are being provided to an increasing extent with the capacity for autonomous driving. The driving of a motor vehicle on its own presupposes that information about the environment of the motor vehicle will be made available. For instance, a motor vehicle designed for autonomous driving has to be able to recognize other road users such as secondary vehicles and pedestrians, for example.

A further important aspect relates to the roadway surface currently being driven on by a motor vehicle in the given case. The driver of a motor vehicle typically registers the condition of the roadway visually, adapting his/her driving style appropriately. If, for example, the roadway appears to the driver to be slippery or smooth, the driver typically drives more cautiously and, where appropriate, also activates suitable systems such as an all-wheel drive, for example.

On the other hand, in the case of a motor vehicle driving on its own or, to be more exact, autonomously, it is necessary that the motor vehicle itself inspects the roadway surface. An automated estimation of the friction of the roadway can contribute toward making the control of the vehicle more intelligent, particularly in the case of the autonomous driving of a motor vehicle.

Diverse methods are known in the state of the art that enable differing types of roadway to be differentiated by utilizing camera systems. One technology that is employed in this connection involves the connection of two cameras, each equipped with a polarizing filter, said polarizing filters having been rotated by an angle of 90° in relation to one another. Since the light polarized on a wet surface is registered only by the camera having the appropriate polarizing filter, from the difference between the respective camera images it can be inferred, for example, whether the vehicle is driving on a wet roadway. However, this method cannot be used in a vehicle that is equipped with only one camera.

In another approach, differing image parameters—such as, for example, luminescence, color information and surface structure—are extracted, and the corresponding properties are used for the purpose of training a classifier. However, known approaches are correspondingly limited to the use of color cameras and also to the use of a limited number of properties or filters.

With respect to the state of the art, reference is made merely in exemplary manner to WO 2013/173911 A1,US 2013/0226421 A1, CN 101609607 A, JP 2002162343 A and JP 2002162343 A.

SUMMARY

It is an object of the present disclosure to make available a method and an arrangement for assessing the roadway surface being driven on by a vehicle that enable a rapid and reliable assessment, in particular for the purpose of utilization by driver-assistance systems or such like.

In a method according to the disclosure, on the basis of at least one image recorded with a camera that is present on the vehicle, the roadway surface being driven on by the vehicle is classified using a classifier, wherein the classifier is trained on the basis of image features that are extracted from the at least one image, wherein a plurality of image details are defined in the at least one image, wherein the extraction of image features is performed independently for each of these image details.

According to the disclosure, in particular a roadway surface is classified using a camera that is present on board a vehicle, wherein the assignment to one of a plurality of roadway types or roadway conditions (for example, the three types "dry roadway", "wet roadway" and "snow-covered roadway") is performed. Differing properties or features are extracted from the recorded images, these features being used for the purpose of training differing classifiers. Finally, a check of these classifiers can be made on the basis of validation images, leading to an increased accuracy (of, for example, over 95%).

The concept further underlying the disclosure is, in particular, to make available and to train a classifier for assessing the roadway surface being driven on by a vehicle, wherein a plurality of roadway images is used that correspond to differing roadway conditions (for example, dry, wet, snow, ice, mud, grass, sand, etc.).

The disclosure further involves, in particular, the concept of using a plurality of images that were recorded by one or more cameras at certain points in time, in which connection the respective camera (or cameras) may be a front camera, side camera or rear camera. In each image, the registration or identification of the roadway and also a division of the camera image into smaller images, which in the following will also be designated as "roadway sections" ("road-boxes"), then take place. In accordance with the disclosure, each roadway section can be classified in real time. The results of this classification for all roadway sections are combined with one another, in order to generate a corresponding roadway-surface map for the environment of the vehicle.

One advantage of the disclosure is the possibility of the use of a gray-scale camera (that is to say, without provision of color information), in which case, in addition, a relatively low camera resolution is sufficient.

The method according to the disclosure is designed for real-time application, in the course of which, in particular, no storage of the respective image is required after data processing.

In accordance with the disclosure, in particular two image sets can be used, one of these image sets being a training set for training the algorithm according to the disclosure, and the other of these image sets being a validation set for validating the efficiency of the algorithm. In this case, each of the two image sets may, merely in exemplary manner, consist of 45 images, 15 images being used in each instance for each of the three types of roadway. In this case, the images of the validation set may belong to the same image sequence or the same clip as the images of the training set and, for example, may be recorded a few seconds later, so that, in each instance, the same type of roadway is present, merely a different detail of the roadway being represented. The individual images of the respective image set preferentially exhibit great variation as regards the road surfacing (for example, asphalt or cobblestone pavement), the lighting conditions (sunny or cloudy) or the weather conditions (for example, heavy rain), in order to achieve a greater robustness of the algorithm according to the disclosure in the face of a change of scenery or of the weather conditions.

Figure 2A:
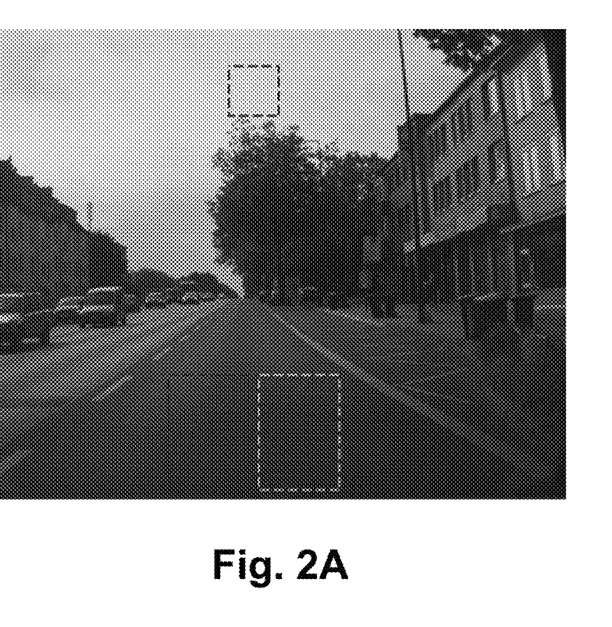
FIGS. 2A and 2B are, in each instance, exemplary images for elucidating a possible way of proceeding in the course of the image selection performed in accordance with the disclosure.
Figure 2B:
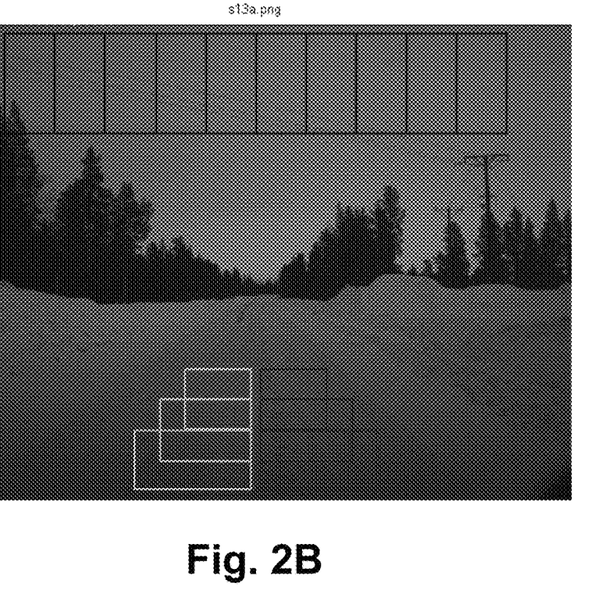

After an optional trimming of the images (for the purpose of eliminating undesirable information) a selection of, for example, three regions or details in the individual images can be made (for example, according to FIG. 2A, two details of the respective lane and also a detail of the sky or horizon for the purpose of calculating further properties—see the following explanatory remarks relating to step S130). As indicated in FIG. 2B, a subsequent modification of the chosen image details as regards number and shape or geometry can take place, in order to take into account, the influence of interfering objects contained in the respective image, fluctuations in light intensity and also the influence of changes, caused by perspective, in the actual size of the region of the roadway reproduced in the image detail in each instance.

The classification, carried out in the further steps described below, takes place separately for the previously chosen (for example, three) image details, wherein, as elucidated in still more detail in the following, the assignment to a class in each instance can be performed with reference to a plurality of (for example, three) regions on the basis of a weighting.

Since the number of images used for the purpose of training the classifier is crucial for the quality of the estimate achieved, a still higher accuracy of the classification can be achieved by consideration of further "subclasses" pertaining to the predefined classes.

Moreover, with the method according to the disclosure, no physical model of the vehicle or of the roadway is required, in which connection, in particular, also no estimate of the roadway profile height is needed. Moreover, an automatic calibration can take place if, for example, a misclassification of roadway surfaces is present. A further advantage of the disclosure is that no color camera is needed. With increasing camera resolution, an increased accuracy of the method according to the disclosure can also be obtained. The method according to the disclosure can be used in differing vehicle control systems, for example ABS (anti-lock braking system), EPAS (electric power-assisted steering), ADAS (advanced driver assistance systems), or ACC (adaptive cruise control).

The roadway classification according to the disclosure can, in particular, be used to establish a linkage between the roadway images and the respective tire-friction capacity, in order to obtain an easily usable interface for vehicle control systems.

The roadway classifications assigned in accordance with the disclosure may, in particular, contain combinations of different information, for example relating to the roadway-surface conditions ("dry", "damp", "wet", "snow", "ice", "slush"), the type of roadway (for example, new asphalt, old asphalt, cobblestone pavement, concrete, gravel, construction work, sand, off-road terrain) or friction-interval classes (for example, high friction: 0.8 to 1.2, medium friction: 0.3 to 0.8, low friction: 0 to 0.3).

The results obtained with the method according to the disclosure can be exchanged with a central unit, in order to help in the construction of intelligent road maps which contain real-time data from different sources (or vehicles).

Further configurations of the disclosure can be gathered from the description and also from the dependent claims.

The disclosure will be elucidated in more detail below on the basis of exemplary embodiments represented in the appended illustrations.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In accordance with the disclosure, a method is made available that is able to assign an image of a roadway surface, which was recorded by means of a camera mounted within the vehicle, to one of a plurality of classes as regards the condition of the roadway, for example "dry roadway", "wet roadway" or "snow-covered roadway", wherein a widening of the classes may also take place for the purpose of incorporating further roadway conditions (such as, for example, ice, mud, sand, etc.).

Figure 1:
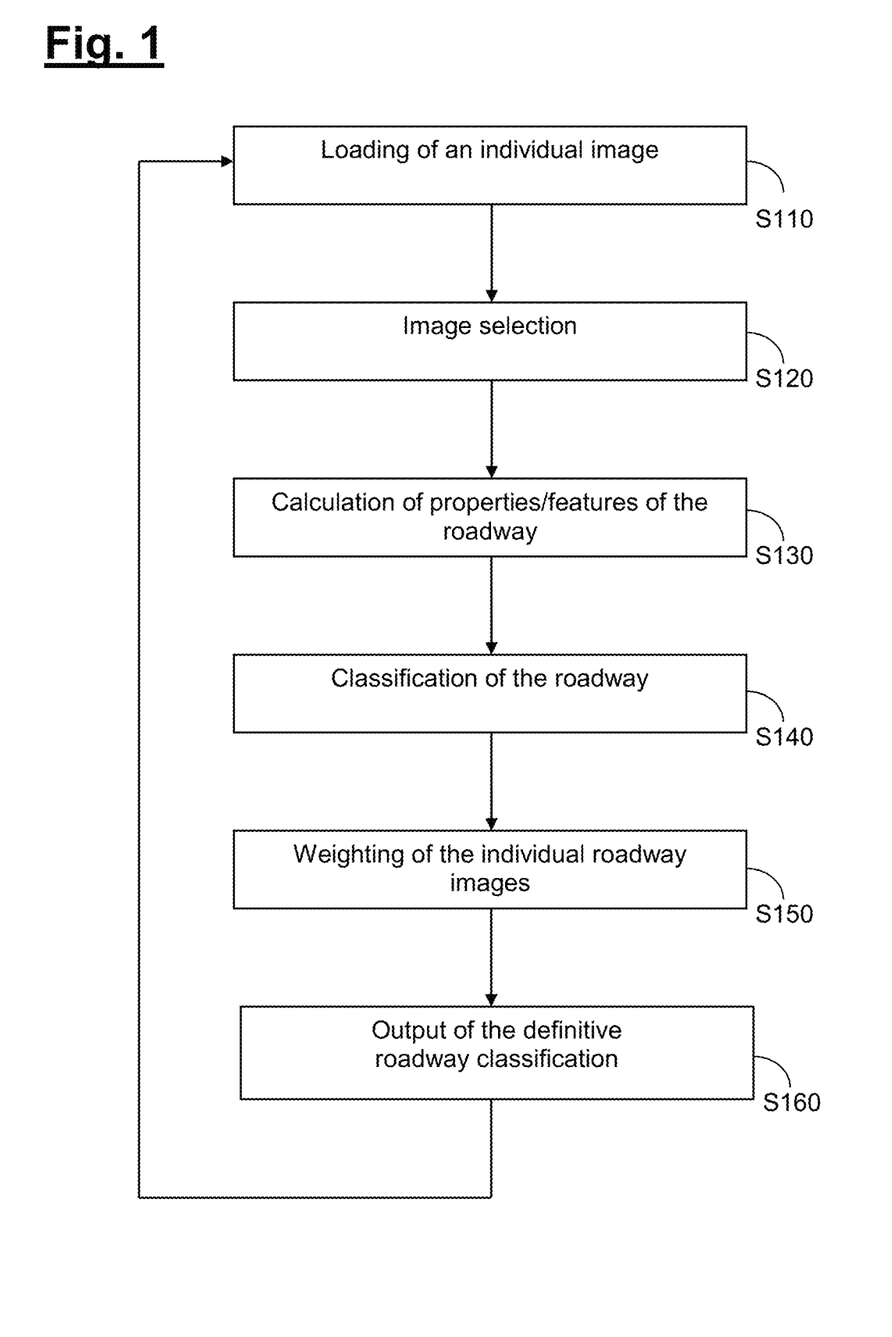
FIG. 1 is a flow chart for elucidating the sequence of the method according to the disclosure in an embodiment.

The algorithm according to the disclosure involves, in particular, the following steps, represented in the flow chart of FIG. 1:

In a first step S110, the loading of an individual image from the camera takes place by using an image-loading unit, the respective individual image being transmitted from the camera to the corresponding processing unit.

As soon as the (individual) image in question has been correctly received, in a second step S120 an image selection is performed, in the course of which roadway-image sections to be processed are selected from the main or overall image. In the following, a division into three classes—namely "dry roadway", "wet roadway", and "snow-covered roadway"—will firstly be assumed. A more robust behavior of the algorithm according to the disclosure can be achieved, by roadway-image sections for each of these classes being selected that differ as regards further properties such as, for example, the roadway surface (asphalt, cobblestone pavement, etc.) or the lighting conditions (for example, clear, cloudy, backlighting, heavy rain, etc.). Moreover, an improvement of the algorithm can be obtained, by the image selection being modified where appropriate if, for example, objects (such as trees or bridges), which in addition diminish the useful light intensity, are located in the respective image detail.

In accordance with the disclosure, in particular roadway sections ("roadboxes") can be defined in each of the images (in which case, for example, use may be made of at least 6 roadway sections per image). Each of these roadway sections or each "roadbox" represents a specific, defined and bounded roadway section ahead of the vehicle or in the environment of the vehicle (for example, at a known spacing from the vehicle). From each of these roadway sections, corresponding image features are then extracted, as described in the following.

In a further step S130, the calculation of properties or features of the roadway takes place. In an exemplary embodiment, for each roadway image a total of 22 properties or features can be calculated, for example. These features constitute the initial values for special image filters. In the algorithm proposed in accordance with the disclosure, use may be made of standard properties or features such as, for example, an image histogram and the contrast.

Figure 3:
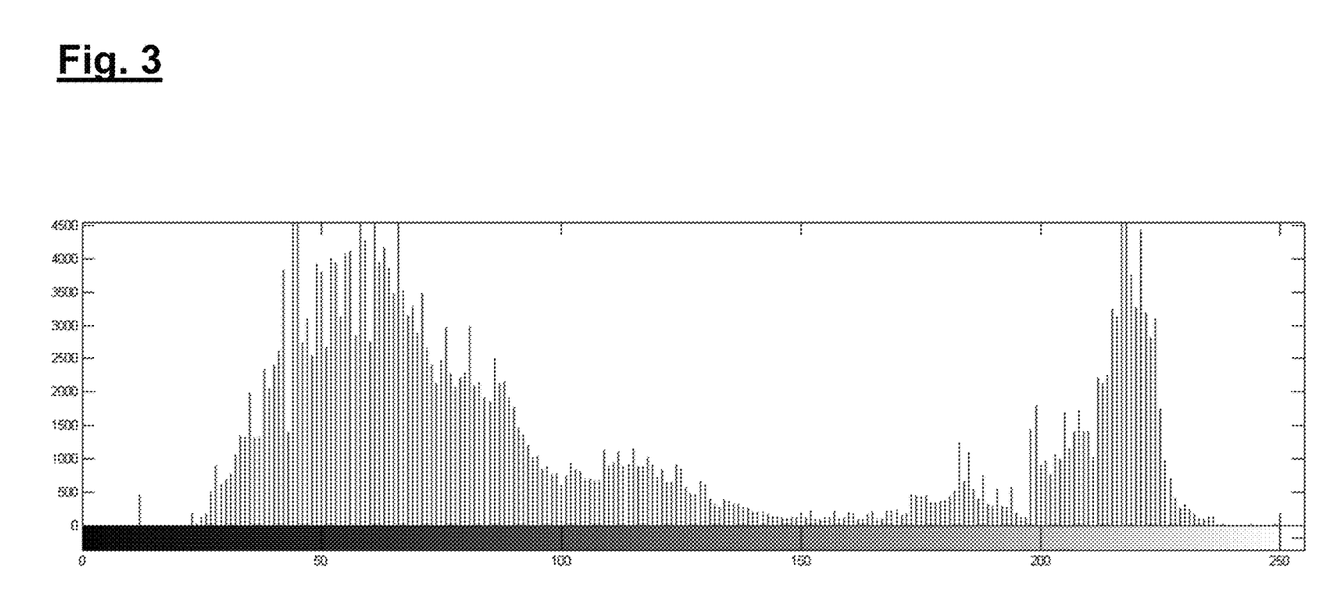
FIG. 3 is a histogram for elucidating the image analysis performed in accordance with an embodiment of the disclosure.

FIG. 3 shows an exemplary histogram of an image, wherein a brightness value between "0" (="black") and "255" (="white") is assigned to each pixel. In the histogram of FIG. 3 two peaks are discernible, the peak situated in the darker region corresponding to the roadway, and the peak situated in the brighter region corresponding to the sky.

In the course of the image analysis according to the disclosure, differing image properties or features are calculated in step S130. One of these properties is the entropy as a measure of the randomness of the distribution. In this connection a high entropy signifies that all the pixels are distributed comparatively uniformly over the gray-scale range, whereas pronounced peaks and a correspondingly uneven distribution in the histogram are present in the case of a low entropy. In this way, the entropy can be set in relation to the surface structure ("texture") of the roadway.

As a further image property, the intensity ratio of the intensities obtained for "roadway" and "sky" is determined. In this case, the circumstance can be taken into account that, although a snow-covered roadway appears, as a rule, brighter than a clear or dry asphalted roadway, the intensity is also determined by the brightness of the scenery, so that a snow-covered roadway in darkness may lead to the same intensity value as a clear asphalted roadway in the case of extreme brightness. By the intensity ratio of roadway and sky being drawn upon, however, a distinction can be made between the aforementioned scenarios, since a dark asphalted roadway in the case of a bright sky provides a higher intensity ratio than a snow-covered roadway in the case of a dark or cloudy sky.

As a further property, the so-called gray-value matrix (GLCM=gray-level co-occurrence matrix) can be calculated for the purpose of providing texture information. In this case, the frequencies of certain combinations of gray-scale values for the respective neighboring pixels of a pixel are ascertained in a known manner, this ascertainment being carried out successively for all pixels.

A further possibility for ascertaining the texture information from the respective image is the calculation of the so-called LBP (=local binary pattern), wherein for each pixel the values of the surrounding pixels within a predetermined radius are ascertained and compared with a threshold value (corresponding to the value of the central pixel). With this method, the occurrence of particularly large gradients within the respective image can be identified, from which the uniformity of the respective roadway surface can likewise be inferred.

The quantitative registration or assignment of a numerical value can take place by means of correlation, wherein firstly the gray-value matrix for the LBP is ascertained and then the correlation of this gray-value matrix is calculated.

In the next step S140, a classification of the roadway takes place. In this case, for each roadway image the calculated properties or features are used as input data for a classifier, in order to achieve or to output an optimal classification of the roadway. In this case, a total of six possible roadway classifications, for example, can be obtained on the basis of six different roadway images of one and the same main image.

The classification models capable of being employed in accordance with the disclosure include (however, without the disclosure being restricted thereto), for example, trained SVM models (SVM=support vector machine) or trained neural networks (deep-learning neural networks). The training of the classifier models according to the disclosure can take place offline or online as self-training of the classifier models, in order to perform an adaptation to differing roadway types and conditions.

Each roadway section is classified in a manner depending on the extracted image properties or features. Physical properties are extracted by on-board sensors such as IMU (inertial measuring unit), GPS (global positioning system), for example, or by sensors for ascertaining the suspension height, the steering angle, the wheel speed, or by driver inputs. The extracted physical features may include (without the disclosure being restricted thereto) the coefficient of tire friction, tire-stiffness parameters, tire forces and steering torque. Weather data (for example, dew point or temperature) may likewise be used as physical properties. Moreover, a data linkage may take place, in order to combine the classification results for each roadway section and the physical properties with one another and, for example, to extract a roadway friction map for a roadway section situated ahead of the respective vehicle or for the environment of the vehicle.

In accordance with the disclosure, differing classification methods having differing complexity can be applied.

One possibility is the so-called "nearest-neighbor classification" (also designated as KNN, "k-nearest-neighbor" algorithm), in which a class assignment is performed, taking the k nearest neighbors into consideration. In this case, for the purpose of classifying a new data point the k nearest data points are analyzed, the new data point being allocated to the class that corresponds to the majority of the k nearest data points.

A further possible method is the classification-tree method, in which a successive division of the data on the basis of a plurality of decisions made in succession takes place in a manner known as such.

In a further embodiment, use may also be made of a group (ensemble) of classifiers, for example a group of decision trees or classification trees.

The classification described above is carried out independently for the different image details, wherein, as a result, a majority decision for a class can be made in each instance. This majority decision may, in turn, be preceded by a weighting, by which the otherwise existing problem can be taken into account, namely that a tied score may result in the case of respectively differing classes obtained for each image detail. By virtue of this weighting, in each instance that image detail which provides the most meaningful information can be taken into consideration particularly strongly. Merely in exemplary manner, the lower image region can be taken into consideration with a weighting factor of 1.5, the central image region with a weighting factor of 1.25, and the upper image region with a weighting factor of 1.

Figure 4:
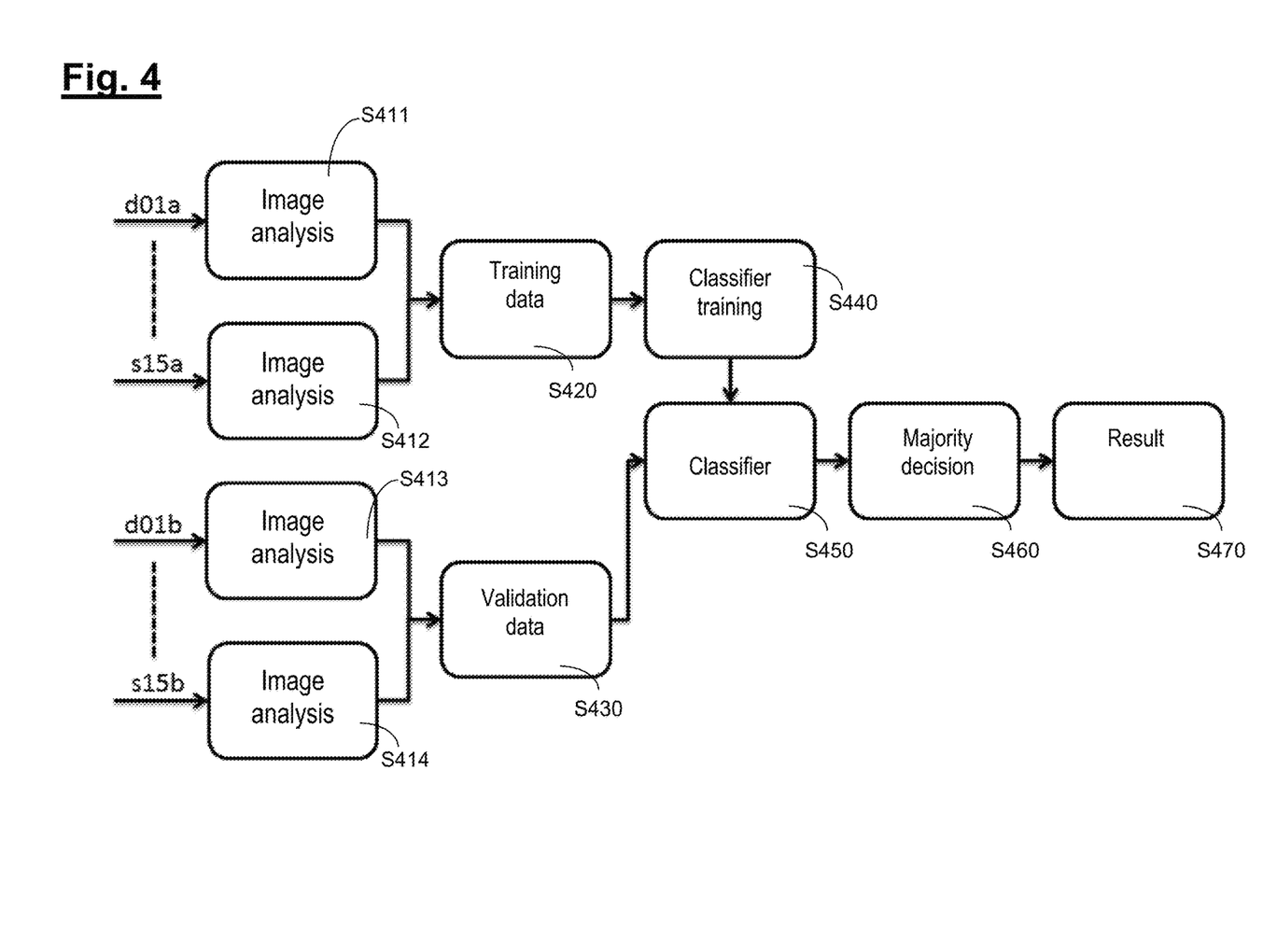
FIG. 4 is a further flow chart for elucidating a possible basic sequence of the method according to the disclosure.

According to FIG. 4, the classification according to the disclosure starts with the image analysis of the (for example, 45) training images (steps S411-S414). By this means, the training data (S420) are obtained that contain the respective properties for the training images. The training data are thereupon used in order to train the corresponding group or ensemble of classifiers (S440), leading to the receipt of an ensemble classifier. This classifier is thereupon checked on the basis of the validation data (S430) that were ascertained from the analysis of the validation images. After classification of the validation data, the result is compared with the known classes, from which the accuracy of the method carried out is calculated. In Table 1, the accuracy for the differing classifiers is specified on the basis of an exemplary embodiment.

In this case the accuracy has been defined as the number of correctly classified images of a class divided by the total number of images in the class in question. If, for example, of 30 images for a dry roadway 29 have been classified correspondingly as "dry roadway", the corresponding accuracy amounts to 96.7%.

TABLE 1

| Classifier | Dry [%] | Wet [%] | Snow [%] | Mean [%] | Speed (FPS) |
| --- | --- | --- | --- | --- | --- |
| Classifier Tree | 96.7 | 86.7 | 86.7 | 90 | 19 |
| Ensemble | 99.7 | 86 | 95.6 | 93.7 | 6 |
| SVM | 100 | 93.3 | 96.7 | 96.7 | 12 |

In a further step S150, for each roadway image an intrinsic weighting can be taken into consideration.

After consideration of the respective weightings of the individual roadway images and after appropriate combination, with renewed reference to FIG. 1 the output of the definitive roadway classification takes place in step S160. Subsequently, according to FIG. 1 a return to step S110 takes place, in order to receive a new camera image for processing.

The method described above can be carried out in real time. Prior to an implementation in a motor vehicle a calibration is preferentially carried out, in order to perform a training of the classifier for the roadway surfaces or properties to be determined in the given case.

Even though in the embodiment described merely individual images are used for the purpose of roadway assessment and consequently, in particular, no stereoscopic camera is required, the disclosure is not restricted to the use of a single camera. In further embodiments, a stereoscopic camera may also be used for the purpose of improving the efficiency.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for assessing a roadway surface for a vehicle comprising:
capturing an image of a roadway with a vehicle-mounted camera, the image defining a plurality of image details;
extracting image features independently for each of the plurality of image details, wherein at least some of the features are textural details based on an entropy of the image;
classifying the roadway surface using a classifier to determine a roadway class, the classifier including the image features as input data, wherein the classifier is trained based on the extracted image features;
determining weather conditions with at least one on-board vehicle sensor; and
utilizing a driver-assistance system to control the vehicle according to a friction map that is based the roadway class and the weather conditions.

2. The method as claimed in claim 1 further comprising weighing the image features extracted for each of the plurality of image details using different weights.

3. The method as claimed in claim 1, wherein the classifying of the roadway surface takes place in real time.

4. The method as claimed in claim 1 further comprising checking the classification of the roadway surface based on validation data.

5. The vehicle as claimed in claim 1, wherein the friction map indicates a coefficient of tire friction between the roadway and tires of the vehicle.

6. A vehicle arrangement for assessing the roadway surface comprising:
a camera disposed on the vehicle and configured to capture at least one image of a roadway, the image defining a plurality of image details; and
a processing unit configured to:
extract image features independently for each of the plurality of image details, wherein at least some of the features are textural details based on an entropy of the image,
classify the roadway surface using a classifier to determine a roadway class, the classifier including the image features as input data,
determining weather conditions proximate the vehicle, and
control a driver-assistance system of the vehicle according to a friction map that is based the roadway class and the weather conditions.

7. The vehicle arrangement as claimed in claim 6, wherein the processing unit is further configured to weight each of the image features differently via the classifier.

8. The vehicle arrangement as claimed in claim 6, wherein the processing unit classifies the roadway surface in real time.

9. The vehicle as claimed in claim 6, wherein the camera is a black-and-white camera.

10. The vehicle as claimed in claim 6, wherein the friction map indicates a coefficient of tire friction between the roadway and tires of the vehicle.

11. The vehicle as claimed in claim 6, wherein at least some of the textural details are based on a gray-value matrix of the image.

12. The vehicle as claimed in claim 6, wherein the classifier is trained based on the extracted image features.

13. A vehicle comprising:
a camera that records an image having image details of a roadway; and
a processor configured to,
extract image features for each of the image details, wherein at least some of the features are textural details based on a gray-value matrix of the image, classify the roadway surface using a classifier to determine a roadway class, the classifier including the image features as input data,
determining weather conditions proximate the vehicle, and
control a driver-assistance system of the vehicle according to a friction map that is based the roadway class and the weather conditions.

14. The vehicle as claimed in claim 13, wherein at least some of the textural details are based on an entropy of the image.

15. The vehicle as claimed in claim 13, the processor classifies the roadway in real time.

16. The vehicle as claimed in claim 13, wherein the friction map indicates a coefficient of tire friction between the roadway and tires of the vehicle.

17. The vehicle as claimed in claim 13, wherein the camera is a black-and-white camera.

18. The vehicle as claim in claim 13, wherein the classifier is trained based on the extracted image features.

* * * * *